(12) United States Patent
Cissom

(10) Patent No.: US 7,451,914 B2
(45) Date of Patent: Nov. 18, 2008

(54) SYSTEM AND METHOD FOR PRESERVING HISTORICAL INFORMATION FOR VIEWING BY POSTERITY

(76) Inventor: Stephen Parker Cissom, 332 N. Magnolia St., Sumter, SC (US) 29150

( * ) Notice: Subject to any disclaimer, the term of this patent is extended or adjusted under 35 U.S.C. 154(b) by 0 days.

(21) Appl. No.: 11/356,615

(22) Filed: Feb. 17, 2006

(65) Prior Publication Data

US 2006/0186189 A1   Aug. 24, 2006

Related U.S. Application Data

(60) Provisional application No. 60/733,014, filed on Nov. 3, 2005, provisional application No. 60/655,058, filed on Feb. 22, 2005.

(51) Int. Cl.
*G06K 7/00* (2006.01)
(52) U.S. Cl. ...................... 235/375; 235/486
(58) Field of Classification Search ................ 235/375, 235/486, 487
See application file for complete search history.

(56) References Cited

U.S. PATENT DOCUMENTS

| | | | |
|---|---|---|---|
| 5,404,343 A | 4/1995 | Boggio | |
| 5,696,488 A | 12/1997 | Assisi | |
| 5,729,921 A | 3/1998 | Rojas | |
| 6,340,978 B1 | 1/2002 | Mindrum | |
| 6,414,663 B1 | 7/2002 | Manross, Jr. | |
| 6,463,703 B1 | 10/2002 | Mattis | |
| 6,904,721 B1 * | 6/2005 | Forbes | ........................ 52/103 |
| 2002/0191949 A1 | 12/2002 | Weatherford | |
| 2003/0217120 A1 | 11/2003 | Hickey et al. | |
| 2004/0085337 A1 | 5/2004 | Barrows | |

OTHER PUBLICATIONS

International Search Report from co-pending PCT application, serial No. PCT/US06/06307 filed Feb. 22, 2006.
"Multimedia Tool Organizes a Lifetime of Memories," USATODAY. com, May 28, 2004, 4 pages.
Website located at www.rockofages.com (last accessed Mar. 15, 2007), bearing a copyright date of 2000-2004.

* cited by examiner

*Primary Examiner*—Thien M Le
(74) *Attorney, Agent, or Firm*—Nelson Mullins Riley & Scarborough LLP

(57) ABSTRACT

A system and method that will enable individuals or organizations to store any digital information they wish to preserve for posterity. According to typical methodology, the individual may establish an account with a service provider through which information may be collected for posterity. For example, the service provider may maintain a website to which the information can be uploaded in digital format. The account holder may access the account at any time to manipulate, edit or annotate the information.

5 Claims, 6 Drawing Sheets

| | | | | | | |
|---|---|---|---|---|---|---|
| | | | HOME PAGE | | | |
| | | | PICK A COUNTRY | | | |
| WELCOME TO EPOCHAL SOLUTIONS | PRODUCTS AND SERVICES | ABOUT OUR COMPANY | NEW ACCOUNT REGISTRATION | YOUR ACCOUNT | FREQUENTLY ASKED QUESTIONS | CONTACT US |
| INTRODUCTION INVITATION TO BROWSE SITE MAP | APPLICATIONS a. GRAVESTONE DEVICE b. LANDMARK DEVICE c. CORNERSTONE DEVICE d. KIOSK - MULTIPLE DEVICE COPY OF EPOCHAL PERSONAL STORIES ON CD EPOCHAL FAMILY ESTATES TIME CAPSULE PRICES STORAGE CAPACITIES 128 mb. 256 mb. 512 mb. 1 gig 2 gig | (TELL STEVE'S STORY ABOUT WANTING TO HEAR HIS FATHER'S VOICE.) USE OF FUTURE PROFITS CHRISTIAN BASED COMPANY MISSION STATEMENT COMPANY STATEMENT | 1. CHOOSE TYPE OF ACCT. 2. VIEW SAMPLE ACCT. 3. PURCHASE ACCT. 4. GETTING STARTED / FAQ | 5. DOWNLOADS 6. STANDARD FORMAT 7. PERSONALIZE FORMAT 8. CUSTOMIZE FORMAT 9. REQUEST DEVICE INSTALL 10. ADD/ UPGRADE DEVICE 11. FREQUENTLY ASKED QUESTIONS | PRE-PURCHASE 1. STARTING ACCOUNT (?)'S 2. DOWNLOADS (?)'S POST-PURCHASE 3. TROUBLESHOOTING (?)'S 4. MAX CAPACITY (?)'S 5. TIME SCHEDULES (?)'S 6. DEVICE INSTALLATION (?)'S 7. UPGRADE DEVICE (?)'S 8. ADD INFO TO DEVICE (?)'S 9. ACCOUNT TRANSFERS (?)'S 10. BENEFICARIES (?)'S 11. HOW DO I CONTACT FRANCHISE ? 12. MAY I PURCHASE A FRANCHISE ? | COMPANY E-MAIL DEPARTMENT E-MAILS (2) PERSONAL E-MAILS FRANCHISE |

SYSTEM AND METHOD FOR PRESERVING HISTORICAL INFORMATION FOR VIEWING BY POSTERITY

PRIORITY CLAIM

This application is based upon and claims the benefit of provisional application Ser. No. 60/655,058, filed Feb. 22, 2005 and provisional application Ser. No. 60/733,014, filed Nov. 3, 2005, which are hereby relied upon and incorporated herein by reference.

BACKGROUND OF THE INVENTION

The present invention relates generally to a system and method whereby information can be collected and organized for subsequent transfer to a nonvolatile data storage device for viewing by posterity or other interested parties.

Generally, a deceased person will be laid to perpetual rest in a grave designated by a small monument or other grave marker. The monument will contain limited information about the individual, such as the person's name, dates of birth and death, etc. Relatives will visit the grave to honor and remember the deceased, but the relatives' remembrance of their loved one will often be limited to their own memories, plus a few fading photographs and letters.

A variety of grave markers having active systems for providing personal information have been proposed over the years. Such systems, however, have required substantial modifications to the grave marker itself. In addition, the design of such systems may make the grave marker more susceptible to vandalism and accidental damage. In addition, modified grave markers have required viewing of the information at the grave site itself.

One other system, described in U.S. Pat. No. 6,340,978 (incorporated herein by reference), provides a "memory tube" stored in the coffin of the deceased. Information about the deceased is stored on the memory tube for access by visitors to the grave site. Toward this end, wires run up and through the ground to a connector at the surface. A special hand-held mobile unit includes a mating connector to provide electronic communication with the memory tube. In this manner, a visitor to the grave site can access and view information about the deceased.

Such a system suffers from a number of disadvantages. For example, the use of a special hand-held viewer limits the desirability of the system in comparison to the use of a common personal computer or other ubiquitous and standard electronic device. Also, because the memory tube is in the coffin, it would be extremely difficult to retrofit existing graves using this system. In addition, the memory tube is difficult to repair if it malfunctions or becomes obsolete.

SUMMARY OF THE INVENTION

The present invention recognizes the foregoing and other disadvantages of prior art systems and methods.

In this regard, the present invention provides a system and method that will enable individuals or organizations to store any digital information they wish to preserve for posterity. According to typical methodology, the individual may establish an account with a service provider through which information may be collected for posterity. For example, the service provider may maintain a website to which the information can be uploaded in digital format. The account holder may access the account at any time to manipulate, edit or annotate the information.

At a certain point in time, such as the account holder's death, the contents of the account can be written to a nonvolatile data storage device. The data storage device is placed locally, such as in the account holder's grave marker, for access by visitors (typically the account holder's posterity). The data storage device is preferably configured to allow its electronic contents to be accessed by standard computer equipment, such as a laptop computer running the Windows operating system. In this regard, the data can be copied to the hard drive of the laptop computer for subsequent viewing at the visitor's convenience. The data could also be burned directly onto a CD or other removable storage media.

In addition to grave markers, principles of the present invention may be employed in other applications where it desirable to store information locally (i.e., proximate to and in association with a physical location such as a building).

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Figure 1:
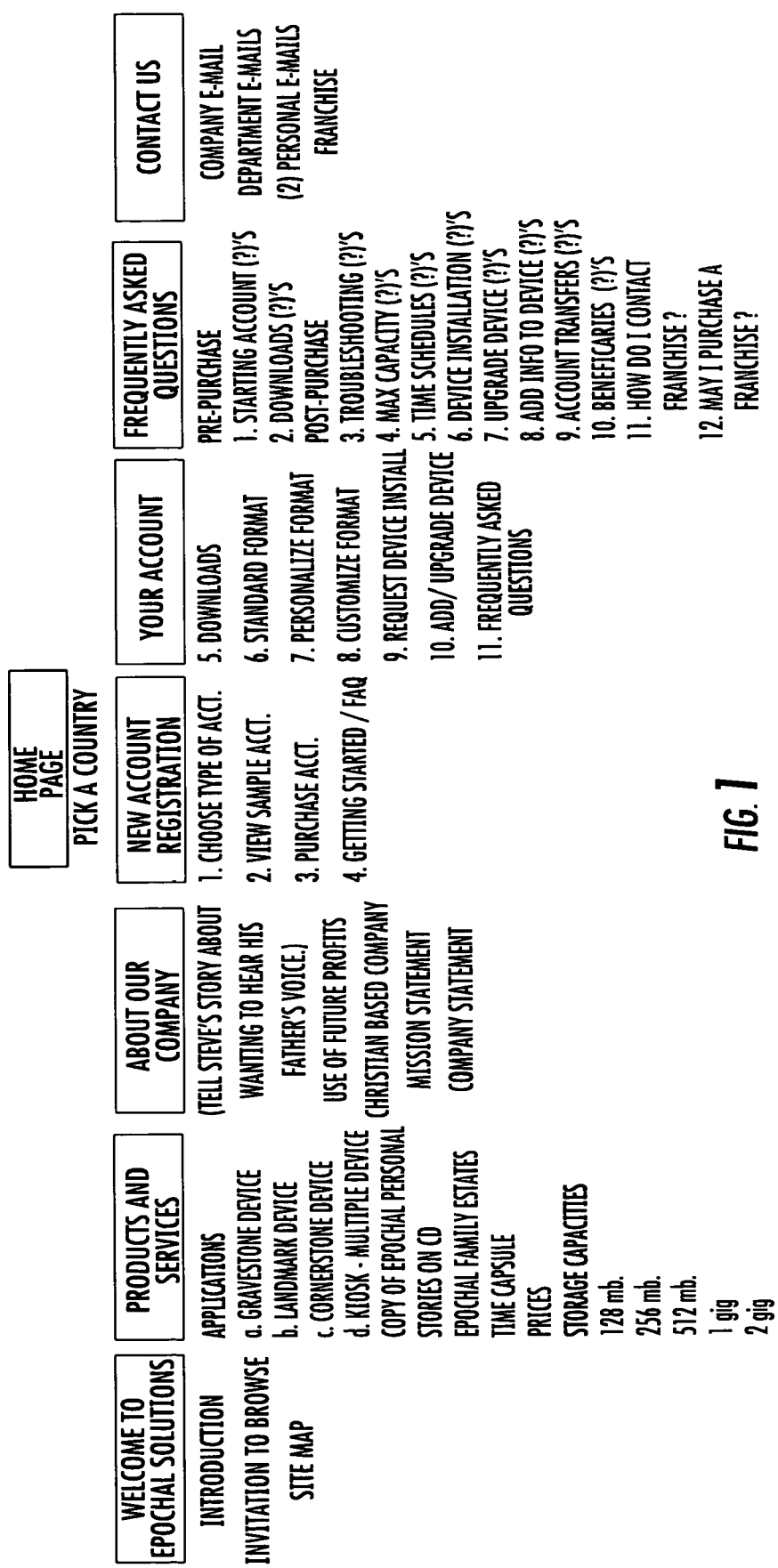
FIG. 1 is a hierarchal depiction of a website that can be employed by a service provider in accordance with the methodology of the present invention.

Repeat use of reference characters in the present specification and drawings is intended to represent same or analogous features or elements of the invention.

DETAILED DESCRIPTION OF THE EMBODIENTS

It is to be understood by one of ordinary skill in the art that the present discussion is a description of exemplary embodiments only and is not intended as limiting the broader aspects of the present invention, such broader aspects being embodied in the exemplary constructions.

As noted above, the present invention provides a system and method that will enable individuals to store any digital information they wish to preserve for posterity. According to preferred embodiments, a user may access a website maintained by the service provider in order to establish a personal account. FIG. 1 depicts the organization of such a website in accordance with one aspect of the present invention.

By establishing the account, the user purchases a nonvolatile data storage device for later use. When the account is established, the client will receive electronic notification of the transaction. Preferably, a hard copy certificate will also be mailed to the client with the suggestion that this be stored with other important documents (e.g., will or insurance papers).

Accessing the account (typically by username and password), the user can store and deposit personal information. For example, the client may send via the global computer network (Internet) any information in the form of pictures, text, video or audio that he or she would like to preserve. The service provider stores and maintains this information for the user in association with the account.

Preferably, the service provider will offer templates to assist the user in developing and personalizing their own account. These templates are for genealogical use, medical information, military service records, burial locations of ancestors and relatives, historical data, etc. The website will also preferably offer the user a choice of language in which to interact with the account.

As more and more data is stored in the account, the user may arrange, edit or annotate the information as desired. For example, descriptions or explanations to any of the data in the account may be added. If the account becomes full, the user may also have the option of purchasing different electronic memories for the data storage device to provide larger capacities.

Preferably, the service provider may supply online assistance for any technical issues the user may be having. Alternatively, or in addition, the user may have the opportunity to purchase editing software offered by the service provider. As software and technology change and upgrade, the client may be notified of these changes with the opportunity to make any appropriate changes needed to stay current with present technology.

In some cases, individuals without Internet access may desire to establish an account with the service provider. Such a user could send information in hard copy to the service provider via traditional mail. The service provider would then convert the hard copy information to digital data.

It is also contemplated that an electronic estate could be formed by family members, friends, or other willing individuals. Information on these accounts may be shared between account holders.

At the time the account holder or a family member wishes to have the data storage device installed in its final location (such as at the time of the account holder's death), the certificate can be sent back to the service provider to begin this process. The service provider will then load all of the data that is stored in that client's account onto the data storage device. The account can then be closed and the information that was in that account will be converted to permanent storage (such as on a server computer maintained by the service provider).

Figure 2:
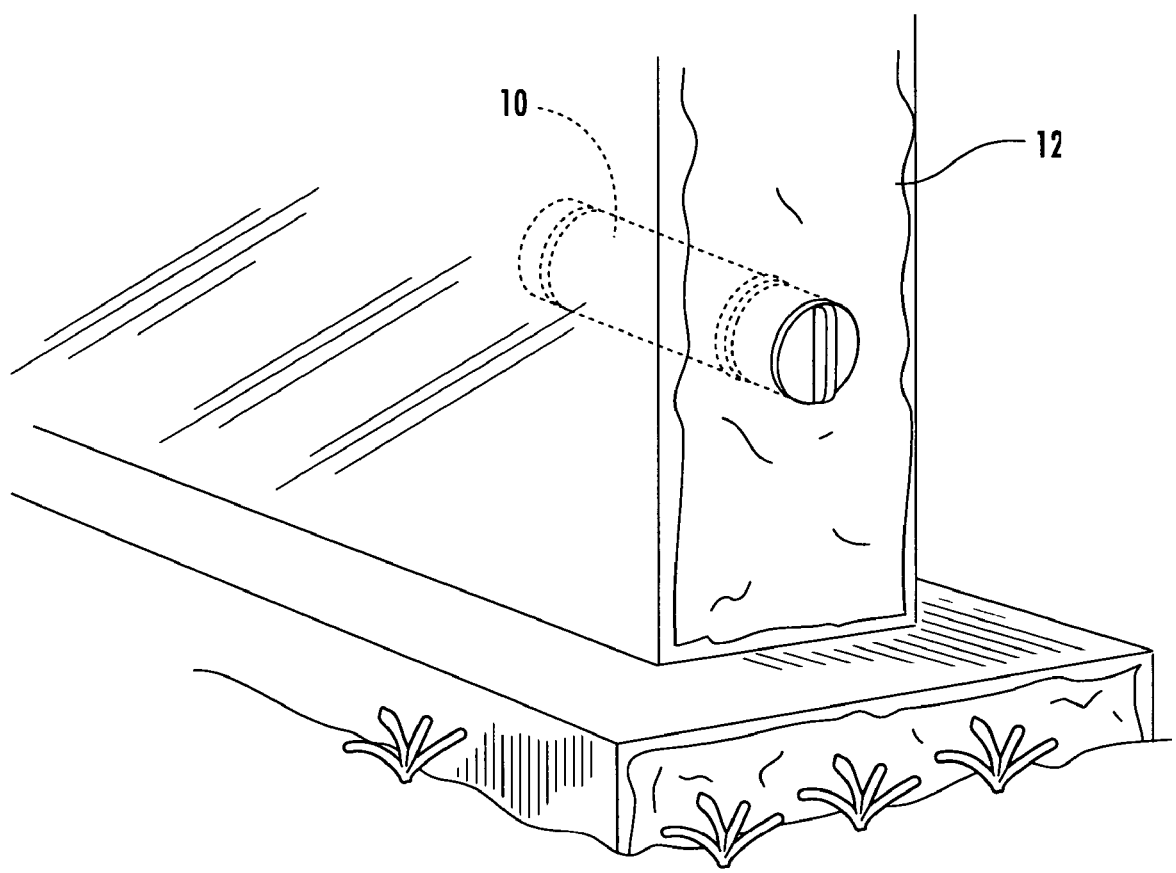
FIG. 2 is a perspective view of a portion of a grave marker having a data storage device constructed in accordance with the present invention installed therein.

At this point, arrangements are also made for the installation of the data storage device in its permanent location. The data storage devices will typically be installed in a permanent structure such as a monument, a tomb stone or flat grave marker, or in the wall of a mausoleum for secure but accessible storage for future visitors. Typically, the device will be inserted into a drilled hole, and is preferably secured with a nonconductive, noncorrosive epoxy. In this regard, FIG. 2 illustrates a data storage device 10 installed in a grave marker 12.

At any time in the future, a family member, friend or interested party may wish to view the information on device 10. This may be done by physically visiting the gravesite, building or other site where the device is installed and accessing it via the proper technology. The information on the data storage device may be viewed at that location or downloaded for future viewing. Accessibility to information stored may be restricted to viewing with a password if the customer desires. If the customer wishes to have the password expire after a period of time, that option could also be provided.

If a relative, friend etc. is unable to access the data from the grave site because of technological deficiencies or geographical barriers, they may make a request to the service provider to receive a copy of the information. The service provider may then expeditiously send a copy of the information on an appropriate medium. Preferably, the website of the service provider may be configured to allow the interested party to do a search to determine if other relatives, friends, individuals or places of interest may have a data storage device.

Figure 3:
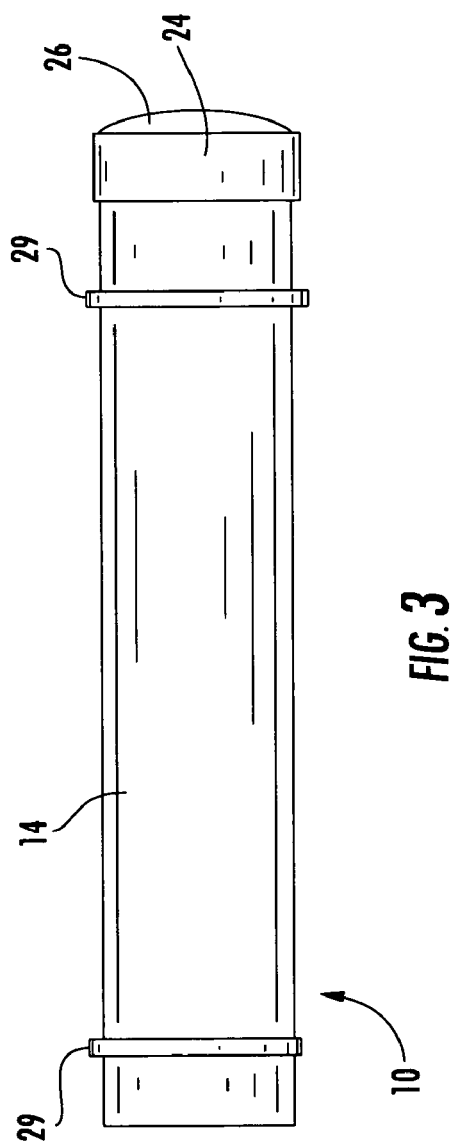
FIG. 3 is a side elevational view of the data storage device shown in FIG. 2.
Figure 4:
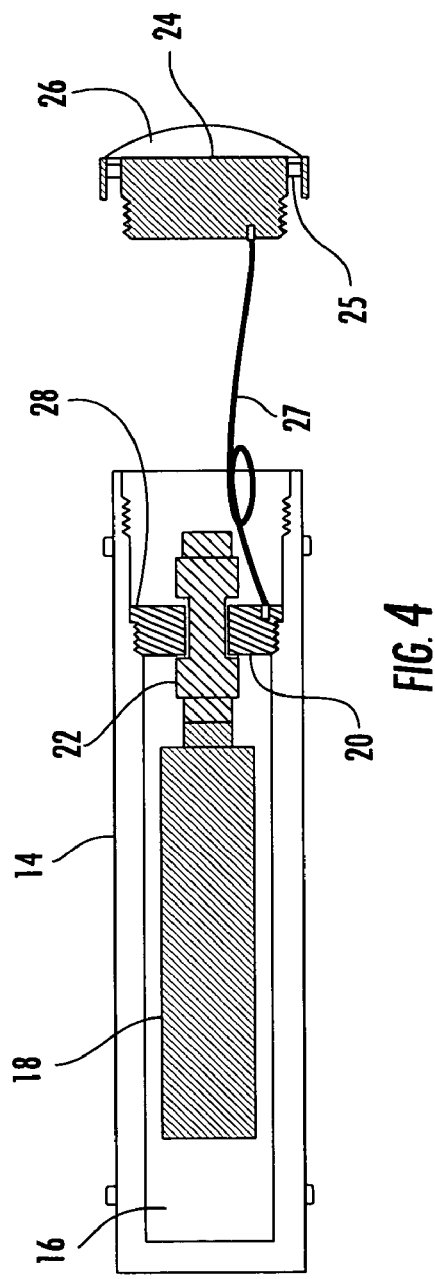
FIG. 4 is a cross sectional view of the data storage device shown in FIG. 2 with the cap removed for purposes of illustration.

Referring now to FIGS. 3 and 4, data storage device 10 may be in the form of a tube 14 formed of plastic or any suitable metal. Tube 14 defines a reduced diameter inner chamber 16 in which a suitable memory element 18, such as solid state memory drive (ssmd) or the like, is located. The inner chamber is bounded by an inner chamber cap 20 having a suitable bus extending therethrough. In the illustrated embodiment, for example, the bus is in the form of a USB cable connector 22 for providing electrical connection with a standard computer.

Preferably, inner cap 20 is designed so that it can only be installed or removed with a special tool to be described herein. Tube 14 is sealed with an outer cap 24 of weather resistant material such as stainless steel in order to protect memory element 18 from adverse climatological conditions and vandals. The outer surface of the cap may be painted or coated to make it blend into the adjacent structure.

The information may be retrieved from data storage device 10 by removing cap 24 and plugging into the port using a laptop computer or hand held device via the USB connector. After the information is downloaded, the USB cable is unplugged and cap 24 is reinstalled.

Data storage device 10 may provided with GPS technology to assist the location of grave sites. Wireless technology for data transfer may also be used when desired.

Further details of the construction of data storage device 10 in accordance with one aspect of the present invention will now be described.

1. Outer Cap 24—Preferably, outer cap 24 has a synthetic gasket 25 to hermetically seal the chamber to provide protection from the elements. Any suitable technique may be used to attach outer cap 24 to the tube 14, such as the mating threads shown in FIG. 4. In another embodiment, outer cap 24 may have two pins on the side which engage two slots in the outer chamber (i.e., the area inside tube 14 but outside of inner chamber 16) so as to lock the cap onto the tube. Outer cap 24 preferably has a fin 26 on the top which allows for gripping the cap to remove it and access to connections housed inside the tube. Outer cap 24 is also preferably adapted to attach a tether 27 which extends between outer cap 24 and inner cap 20.

2. Inner Cap 20—In a preferred embodiment, inner cap 20 may comprise two halves of plastic that mate together to form one solid piece. In this embodiment, inner cap 20 has a mating flange 28 which contacts the end of inner chamber 16. The bottom portion of inner cap 20 is threaded to engage the threads of the inner chamber securing the inner cap into place. There is a hole defined through the central portion of inner cap 20 which allows the passage of USB connector 22. This embodiment includes a plurality of holes (e.g., four holes) in a symmetric pattern on inner cap 20 allowing the engagement of a special tool which installs and removes the inner cap. There is also one small hole at which tether 27 is connected.

3. Tube 14—The tube may be comprised of plastic and defines inner chamber 16 and the outer chamber. Inner chamber 16 houses the memory element 18 and is threaded at its outer end so that it can be closed with inner cap 20. Guide pins or annular flanges 29 may be provided on the outside of tube 14 to be used as a guide to center the tube into a drilled hole. Preferably, tube 14 may have a diameter such that it will fit snugly into a standard 1.5 inch hole.

4. Memory Element 18—Memory element 18 is installed in inner chamber 16 and is secured behind inner cap 20. The memory element can be a storage device of varying memory capacity and may hold any data the procurer of this device wishes to load onto it. Memory element 18 preferably does not include a battery or other on-board source of power, but is dependent upon external power supplied by the hardware used to access the device.

5. USB Connector 22—The USB connector is connected to memory element 18 and passes through inner cap 20. The end of USB connector 22 protruding from inner cap 20 allows for a connection with an external device such as a computer.

Figure 5:
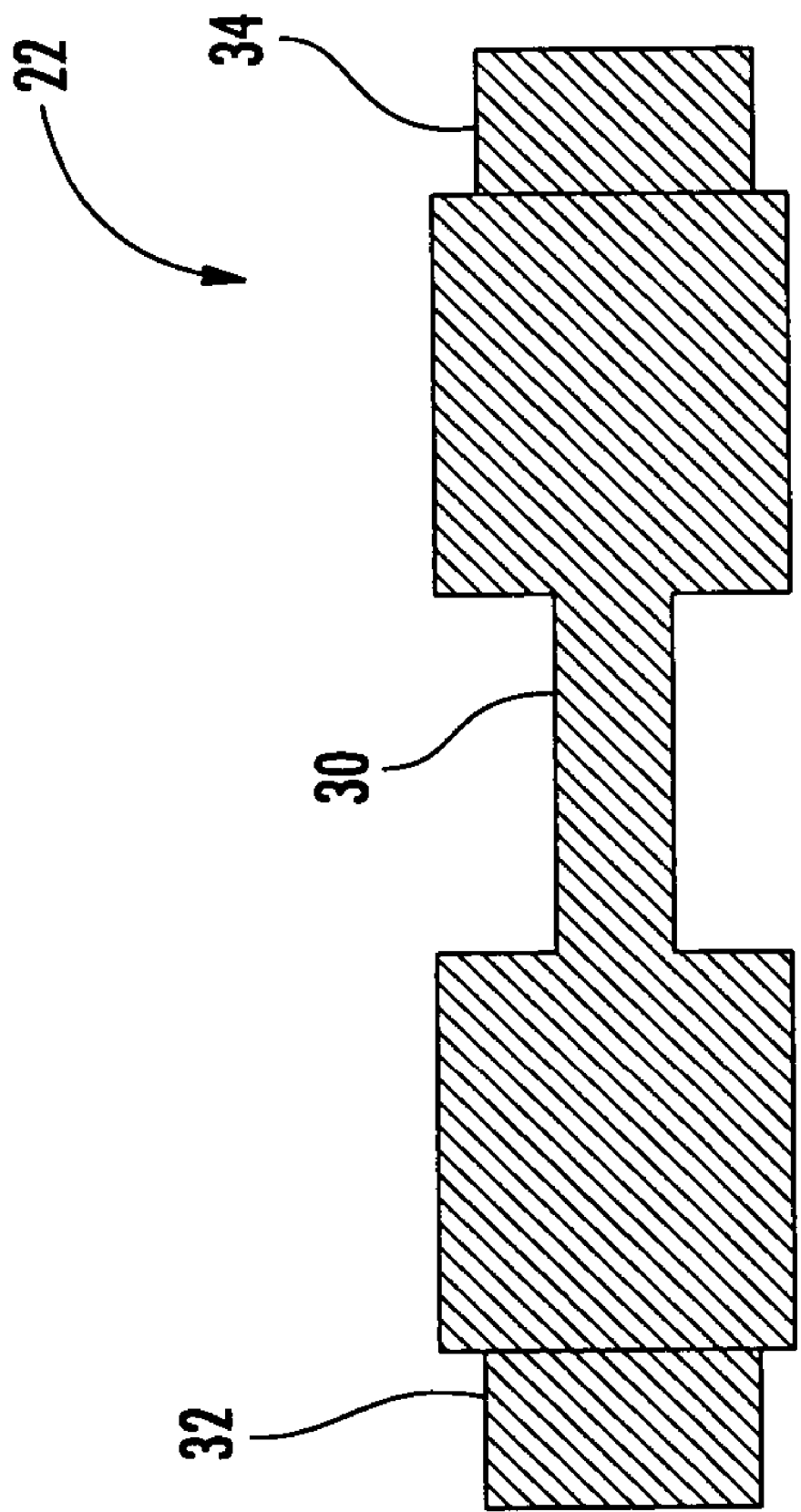
FIG. 5 is a diagrammatic representation of a USB connector that may be used in the data storage device shown in FIG. 2.

Referring now also to FIG. 5, connector 22 has a reduced dimension neck portion 30 that extends through inner cap 20. A first connector end 32 is connected to memory element 18. The external computer connects via a standard USB cable to a second connector end 34. Preferably, the body of connector 22 is encased in suitable molded plastic.

Figure 6:
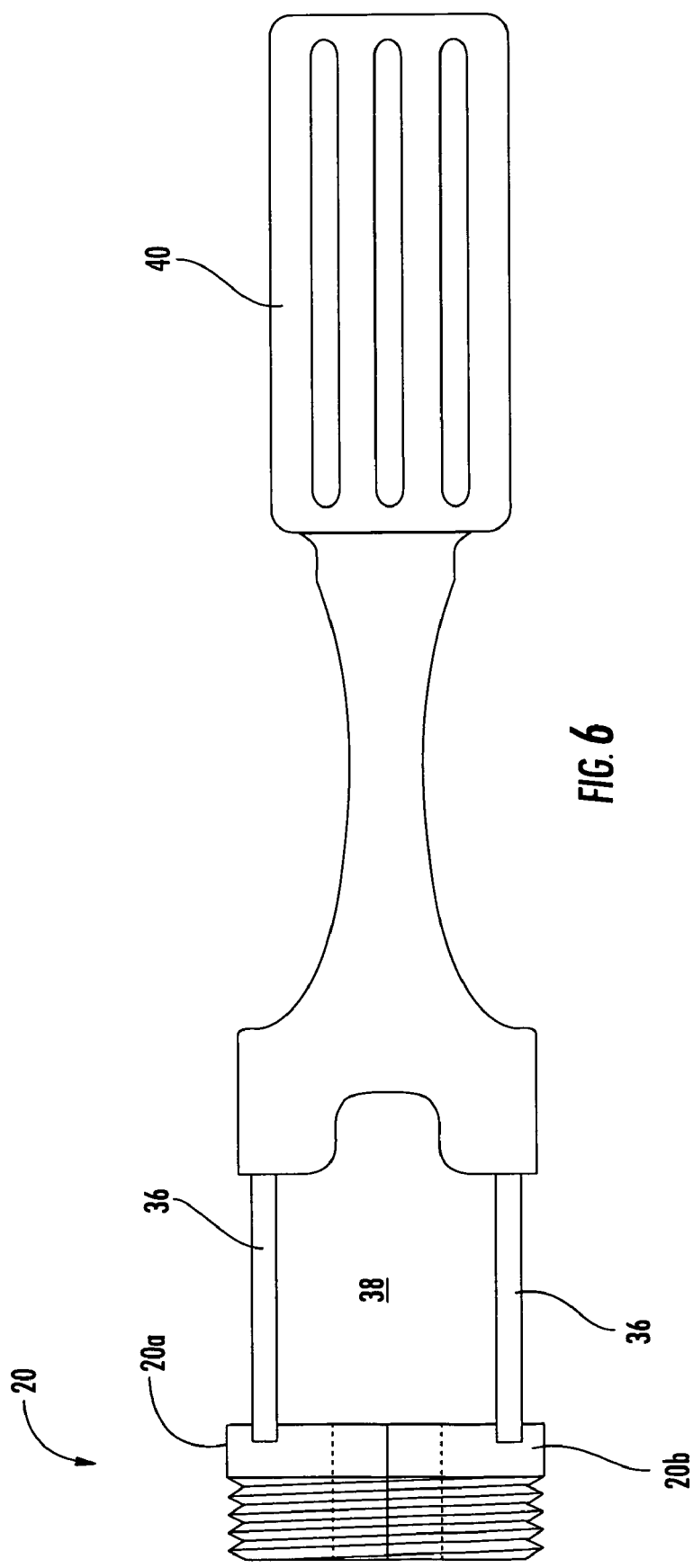
FIG. 6 is a diagram of an inner cap installation tool in accordance with the present invention.

6. Installation Tool—Referring now to FIG. 6, a special installation tool is preferably provided to remove inner cap 20 for access to memory element 18. The tool may be comprised of either plastic and/or steel headed with a unique series of prongs 36 which will engage the holes of inner cap 20 so it may be installed and removed from the tube. At the same time, the tool is configured with sufficient clearance (indicated at 38) to avoid contact with USB connector 34 during use. The installation tool preferably has a "T" handle 40 at the top for ease of use. The two halves 20a and 20b of inner cap 20 are also clearly shown in FIG. 6.

As noted above, the principles of the present invention are not limited to grave sites, but may be employed in other applications where it is desirable to maintain information in association with a physical location. Such other applications for the data storage device include but are not limited to the following:

1. It may be used as a time capsule.
2. It may be installed in a statue, monument or historical marker providing information as to why it is historically significant.
3. It may be installed in the cornerstone of a building.
4. It may be installed in a house, storing any information they may be relevant to that house such as who has lived there in the past. Other information such as the house drawings, paint colors, carpet type, appliance warranties, roof repairs or any other information deemed relevant for future use may also be stored.
5. It may be installed along hiking trails to provide significant information such as emergency contact information or nearest restaurants and hotels.
6. It may also be installed in automobiles. From the time the automobile is purchased, any maintenance from routine to significant can now be stored permanently within the car in a digital format for future owners of the vehicle to know.
7. It may be used by families to store all of the critical information about their children in case they run away from home, become lost or are abducted.
8. It may also be used to store information about anything the client owns for insurance purposes in case of fire, theft or flood
9. The service provider can also provide a chapel type setting for storage of the data storage device for individuals who may not be able to afford the cost of a full funeral.
10. The data storage device may also be installed and sold in a stuffed animal. As the child grows, different events may be recorded into the animal to chronicle the child's development.
11. By installing wireless technology in the memory tube, people could access it at different places such as art museums, national parks, etc. to access the relevant information or whatever a tour entails.

Figure 7:
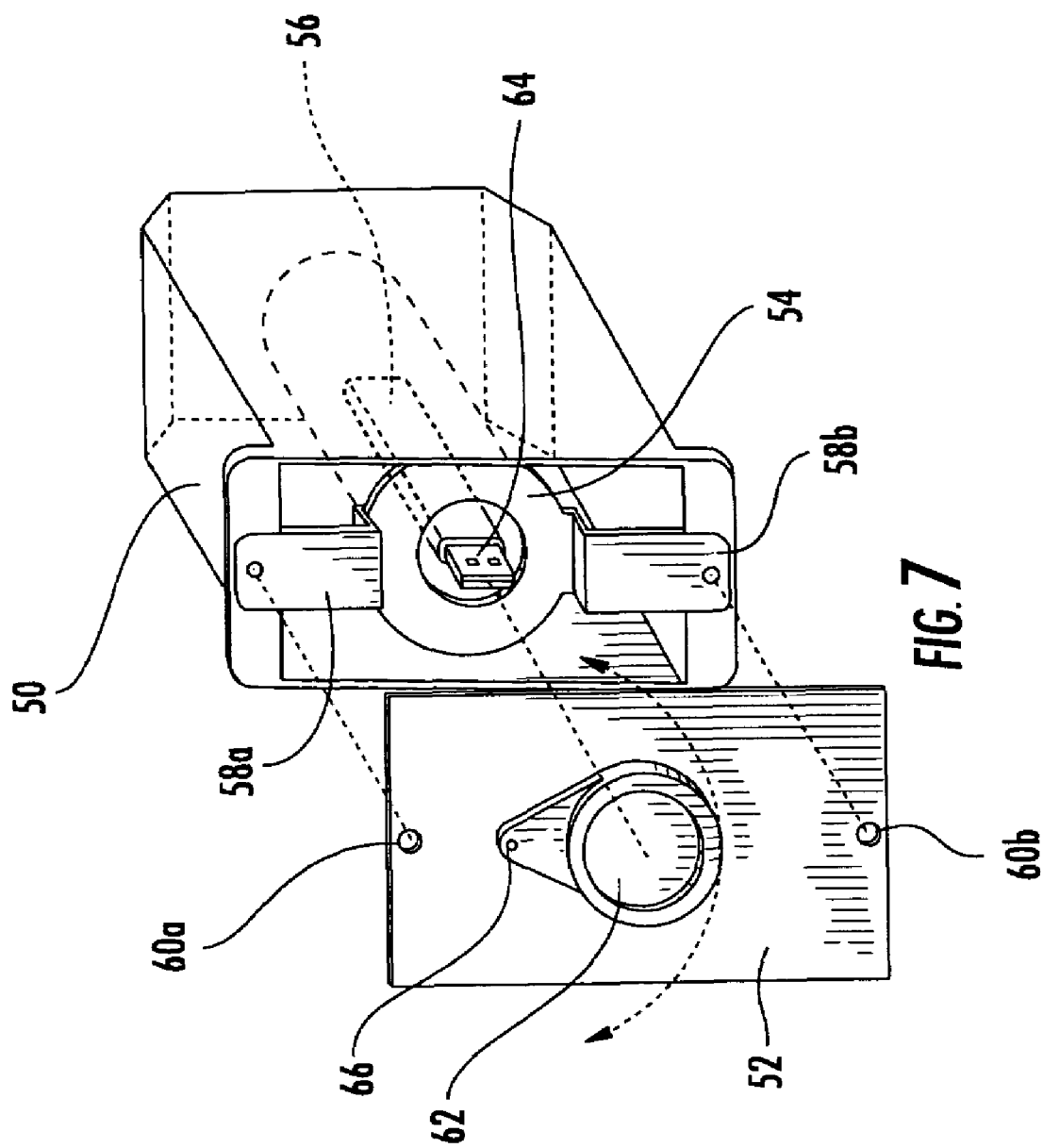
FIG. 7 is a perspective view of an alternative embodiment of a device constructed in accordance with the present invention.

Referring now to FIG. 7, a further embodiment is illustrated that will enable home builders and/or home owners to store digital information that may be pertinent to the house design, property, furnishings or any other information that may be desired to be stored.

This embodiment, which may be referred to as a Home Digital Vault (HDV), comprises a plastic or metal box 50, cover plate 52 and tube 54 that houses a solid state memory drive 56. The HDV may be installed in a wall or be a stand-alone unit that is secure but yet accessible to the owner. In the illustrated embodiment, for example, box 50 may take the form of a typical single electrical junction box. In this case, tube 54 has a pair of lateral brackets 58a and 58b located at its open end. Brackets 58a and 58b have holes that align with respective holes 60a and 60b in cover plate 52. These holes, in turn, align with holes in the front of box 50.

Cover plate 52 further includes a cap 62 which is moved to provide access to USB connector 64. In this embodiment, cap 62 is pivotally attached to plate 52 at pivot 66. As such, the user simply pivots cap 62 to one side in order to access connector 64. A spring or other suitable means may be provided so that the cap automatically moves back to the closed position once the USB cable is unplugged.

Information may be retrieved from the HDV by moving the cap and plugging a USB cable into USB connector 64 using a lap top computer, home pc, or handheld unit (PDA, etc.). The information on the HDV can be viewed at the owner's discretion, and new information may be loaded onto the HDV when desired by the owner.

The owner of the HDV may wish to store information such as the architectural drawings of the house, the lot survey of the property, the septic design and routing, any underground wire routing on the property, reference manuals pertaining to home appliances, color codes and numbers in the house, pictures of the furnishings or any other information the owner wishes to store.

A service provider may offer the service of preloading information onto the HDV prior to shipping it to the buyer. The service provider may also provide the service of permanently storing the data the owner wishes to save on the HDV. This would be done by either emailing the information on the HDV to the service provider or transferring the data onto a disc and sending it to the service provider. Upon receiving the data, the service provider can load the information onto the servers for permanent storage. This information may be retrieved with a proper request from the owner of the HDV.

The HDV is not exclusive to homes and may be used in commercial buildings such as offices, retail outlets, warehouses or any other building where it may be desired to store pertinent information about the referenced structure.

While preferred embodiments of the invention have been shown and described, modifications and variations may be made thereto by those of skill in the art without departing from the spirit and scope of the present invention. It should also be understood that aspects of those embodiments may be interchangeable in whole or in part. Furthermore, those of ordinary skill in the art will appreciate that the foregoing description is by way of example only and is not intended to be limitative of the invention described herein and set forth in the appended claims.

What is claimed is:

1. An apparatus for storing preselected information in digital format for later access by an external electronic device, said apparatus comprising:

a housing adapted for mounting in a wall of a building;

a nonvolatile data storage device fixed in said housing, said nonvolatile data storage device having a memory in which said preselected information is retained;

said nonvolatile data storage device including an electrical connector providing a port for downloading said preselected information; and a cover plate fixed adjacent one end of said housing, said cover plate defining an opening for access to said electrical connector.

2. An apparatus as set forth in claim 1, wherein said nonvolatile data storage device derives its operating power from said external electronic device.

3. An apparatus as set forth in claim 2, wherein said electrical connector comprises a USB connector.

4. An apparatus as set forth in claim 3, wherein said housing is substantially in the form of a single electrical junction box.

5. An apparatus as set forth in claim 1, further comprising a movable cap for covering said opening in said cover plate.

* * * * *